US009185509B2

(12) United States Patent
Myllyla et al.

(10) Patent No.: US 9,185,509 B2
(45) Date of Patent: Nov. 10, 2015

(54) APPARATUS FOR PROCESSING OF AUDIO SIGNALS

(75) Inventors: Ville Mikael Myllyla, Tampere (FI); Jorma Juhani Makinen, Tampere (FI); Kari Juhani Jarvinen, Tampere (FI); Matti Kustaa Kajala, Tampere (FI)

(73) Assignee: Nokia Technologies Oy, Espoo (FI)

( * ) Notice: Subject to any disclaimer, the term of this patent is extended or adjusted under 35 U.S.C. 154(b) by 174 days.

(21) Appl. No.: 13/517,243

(22) PCT Filed: Dec. 23, 2009

(86) PCT No.: PCT/EP2009/067908

§ 371 (c)(1), (2), (4) Date: Jun. 19, 2012

(87) PCT Pub. No.: WO2011/076286

PCT Pub. Date: Jun. 30, 2011

(65) Prior Publication Data

US 2012/0284619 A1 Nov. 8, 2012

(51) Int. Cl.

| | |
|---|---|
| ***G06F 3/00*** | (2006.01) |
| ***H04S 7/00*** | (2006.01) |
| ***H04R 29/00*** | (2006.01) |
| *G06F 3/01* | (2006.01) |
| *H04R 3/00* | (2006.01) |
| *H04R 5/027* | (2006.01) |

(52) U.S. Cl.

CPC ................ *H04S 7/40* (2013.01); *H04R 29/008* (2013.01); *H04R 3/005* (2013.01); *H04R 5/027* (2013.01); *H04R 2430/01* (2013.01); *H04R 2499/11* (2013.01); *H04S 2400/13* (2013.01)

(58) Field of Classification Search

CPC ............ H04R 2430/01; H04R 2499/11; H04S 2400/13

USPC .......................................................... 715/716

See application file for complete search history.

(56) References Cited

U.S. PATENT DOCUMENTS

| | | | | |
|---|---|---|---|---|
| 6,836,243 | B2 | 12/2004 | Kajala et al. | |
| 2005/0226429 | A1 | 10/2005 | Hollowbush et al. | |
| 2006/0239471 | A1 * | 10/2006 | Mao et al. | 381/92 |
| 2008/0146890 | A1 * | 6/2008 | LeBoeuf et al. | 600/300 |
| 2008/0259731 | A1 | 10/2008 | Happonen | |
| 2009/0241753 | A1 * | 10/2009 | Mann | 84/384 |

FOREIGN PATENT DOCUMENTS

| | | |
|---|---|---|
| JP | 2005-159731 A | 6/2005 |
| JP | 2006-261900 A | 9/2006 |
| JP | 2006-287735 A | 10/2006 |

OTHER PUBLICATIONS

International Search Report and Written Opinion received for corresponding International Patent Application No. PCT/EP2009/067908, dated Nov. 12, 2010, 13 pages.

Office Action received for related Chinese Application No. 200980163129.1 , dated Feb. 27, 2014, 9 pages.

Office Action received for related Russian Application No. 2012130912 , dated Dec. 26, 2013, 2013, 4 pages.

* cited by examiner

*Primary Examiner* — Nicholas Augustine

(74) *Attorney, Agent, or Firm* — Harrington & Smith

(57) ABSTRACT

An apparatus comprising at least one processor and at least one memory including computer program code the at least one memory and the computer program code configured to, with the at least one processor, cause the apparatus at least to perform providing a visual representation of at least one audio parameter associated with at least one audio signal, detecting via an interface an interaction with the visual representation of the audio parameter, and processing the at least one audio signal associated with the audio parameter dependent on the interaction.

20 Claims, 8 Drawing Sheets

APPARATUS FOR PROCESSING OF AUDIO SIGNALS

RELATED APPLICATION

This application was originally filed as PCT Application No. PCT/EP2009/067908 filed Dec. 23, 2009.

The present invention relates to apparatus for processing of audio signals. The invention further relates to, but is not limited to, apparatus for processing audio and speech signals in audio devices.

In telecommunications apparatus, a microphone or microphone array is typically used to capture the acoustic waves and output them as electronic signals representing audio or speech which then may be processed and transmitted to other devices or stored for later playback. Currently technologies permit the use of more than one microphone within a microphone array to capture the acoustic waves, and the resultant audio signal from each of the microphones may be passed to an audio processor to assist in isolating a wanted acoustic wave.

With advanced processing capabilities, two or more microphones may be used with adaptive filtering in the form of variable gain and delay factors applied to the audio signals from each of the microphones in an attempt to beamform the microphone array reception pattern. In other words beamforming produces an adjustable audio sensitivity profile.

Although beamforming the received audio signals can assist in improving the signal to noise ratio of the voice signals from the background noise it is highly sensitive to the relative position of the microphone array apparatus and the signal source. Apparatus is therefore typically designed with microphones and beamforming having wide mean omnidirectional sound pickup and low gain unsensitive recording so that loud sounds do not clip the system.

Furthermore video and audio recording or capture for electronic devices is becoming popular. As image recording quality progressively increases on electronic devices, they are becoming more acceptable to be used for day-to-day recording of events such as music concerts, family events, etc. which would have previously required the use of dedicated audio and video recording apparatus.

Typical video recording capability on mobile apparatus enables a user to adjust the image quality or change the camera quickly so that a user may zoom in or out (using either a digital or optical or a combination of digital and optical zooming technology) or may change other recording parameters such as flash, image brightness or contrast, etc. The result of changing of any of these parameters can be clearly seen by the user in such implementations and as such poor quality video capture can be quickly caught and the parameters adjusted to produce an improved recording. However, audio recording capability has not followed these improvements. Typically the user or operator of audio recording apparatus is not technically aware of the sound properties being recorded and thus may not be aware of the sound levels or in which direction the sound is coming from and thus may not catch when a poor or inaccurate audio recording is in progress and therefore may be unable to select or adjust the recording capability of the device to improve the recording. Furthermore even when apparatus has been designed to provide some assistance to the user, it often is displayed in a form which the user is unable to interact with.

Furthermore conventional video recording devices typically attempt to produce an audio capture apparatus which has a static profile with regards to the range of the orientation and in the direction in which the camera is pointing. In such apparatus it is difficult to separate the direction of video recording, in other words the direction the camera is pointing at, and the direction/orientation and profile of audio recording equipment. For example, typical video recorders are typically designed to record video and audio in the same direction only.

This invention proceeds from the consideration that the use of information may assist the apparatus in the control of audio recording and thus, for example, assist in the reduction of noise of the captured audio signals by accurate audio profiling.

Embodiments of the present invention aim to address the above problem.

There is provided according to a first aspect of the invention method comprising: providing a visual representation of at least one audio parameter associated with at least one audio signal; detecting via an interface an interaction with the visual representation of the audio parameter; and processing the at least one audio signal associated with the audio parameter dependent on the interaction.

Providing the visual representation of at least one audio parameter associated with the at least one audio signal may comprise at least one of: determining a capture sound pressure level of the at least one audio signal; determining an audio beamforming profile for the at least one audio signal; determining an audio signal profile for at least one frequency band for the at least one audio signal; and determining an error condition related to the at least one audio signal.

Providing the visual representation of at least one audio parameter associated with the at least one audio signal when the parameter is a capture sound pressure level of the at least one audio signal may comprise at least one of: displaying a current capture sound pressure level as a current level; and displaying a peak capture sound pressure level for a predetermined time period as a peak level.

Controlling the processing of the at least one audio signal associated with the audio parameter may comprise changing the gain of the at least one audio signal capture.

Providing the visual representation of at least one audio parameter associated with the at least one audio signal when the parameter is an audio beamforming profile for the at least one audio signal may comprise at least one of: displaying the audio beamforming profile as a sector of an arc representing the audio beamforming angle; and displaying the audio beamforming profile as a sector of an arc representing the audio beamforming angle relative to a further sector of an arc reflecting a video recording angle.

Providing the visual representation of at least one audio parameter associated with the at least one audio signal when the parameter is an audio signal profile for at least one frequency band for the at least one audio signal may comprise at least one of: displaying an average orientation of the at least one audio signal; displaying a peak sound pressure level audio signal orientation; displaying a sector representing the sound pressure level of the at least one audio signal for the angle associated with the sector, wherein the radius of the sector is dependent on the sound pressure level; and displaying at least one contour representing the sound pressure level of the at least one audio signal, wherein the contour radius is dependent on the sound pressure level.

Controlling the processing of the at least one audio signal associated with the audio parameter may comprise changing the orientation or profile width of the audio beamforming angle.

The beamforming angle may define an angle about the centre point of the spatial filtering of the at least one audio signal.

Providing the visual representation of at least one audio parameter associated with the at least one audio signal when the parameter is an error condition related to the at least one audio signal may comprise at least one of: displaying a clipping warning; displaying a capture error condition of the at least one audio signal; and displaying a hardware error associated with the capture of the at least one audio signal.

Controlling the processing of the at least one audio signal associated with the audio parameter may comprise at least one of: changing the orientation or profile width of the audio beamforming angle; changing the gain of the at least one audio signal; and changing the recording mode.

According to a second aspect of the invention there is provided an apparatus comprising at least one processor and at least one memory including computer program code the at least one memory and the computer program code configured to, with the at least one processor, cause the apparatus at least to perform: providing a visual representation of at least one audio parameter associated with at least one audio signal; detecting via an interface an interaction with the visual representation of the audio parameter; and processing the at least one audio signal associated with the audio parameter dependent on the interaction.

Providing the visual representation of at least one audio parameter associated with the at least one audio signal may cause the apparatus at least to perform at least one of: determining a capture sound pressure level of the at least one audio signal; determining an audio beamforming profile for the at least one audio signal; determining an audio signal profile for at least one frequency band for the at least one audio signal; and determining an error condition related to the at least one audio signal.

Providing the visual representation of at least one audio parameter associated with the at least one audio signal when the parameter is a capture sound pressure level of the at least one audio signal may cause the apparatus at least to perform at least one of: displaying a current capture sound pressure level as a current level; and displaying a peak capture sound pressure level for a predetermined time period as a peak level.

Controlling the processing of the at least one audio signal associated with the audio parameter may cause the apparatus at least to perform changing the gain of the at least one audio signal capture.

Providing the visual representation of at least one audio parameter associated with the at least one audio signal when the parameter is an audio beamforming profile for the at least one audio signal may cause the apparatus at least to perform at least one of: displaying the audio beamforming profile as a sector of an arc representing the audio beamforming angle; and displaying the audio beamforming profile as a sector of an arc representing the audio beamforming angle relative to a further sector of an arc reflecting a video recording angle.

Providing the visual representation of at least one audio parameter associated with the at least one audio signal when the parameter is an audio signal profile for at least one frequency band for the at least one audio signal may cause the apparatus at least to perform at least one of: displaying an average orientation of the at least one audio signal; displaying a peak sound pressure level audio signal orientation; displaying a sector representing the sound pressure level of the at least one audio signal for the angle associated with the sector, wherein the radius of the sector is dependent on the sound pressure level; and displaying at least one contour representing the sound pressure level of the at least one audio signal, wherein the contour radius is dependent on the sound pressure level.

Controlling the processing of the at least one audio signal associated with the audio parameter cause the apparatus at least to perform changing the orientation or profile width of the audio beamforming angle.

The beamforming angle may define an angle about the centre point of the spatial filtering of the at least one audio signal.

Providing the visual representation of at least one audio parameter associated with the at least one audio signal when the parameter is determines an error condition related to the at least one audio signal may cause the apparatus at least to perform at least one of: displaying a clipping warning; displaying a capture error condition of the at least one audio signal; and displaying a hardware error associated with the capture of the at least one audio signal.

Controlling the processing of the at least one audio signal associated with the audio parameter may cause the apparatus at least to perform at least one of: changing the orientation or profile width of the audio beamforming angle; changing the gain of the at least one audio signal; and changing the recording mode.

According to a third aspect of the invention there is provided an apparatus comprising: a display processor configured to provide a visual representation of at least one audio parameter associated with at least one audio signal; an interactive video interface configured to determine an interaction with the visual representation of the audio parameter; and, an audio processor configured to processing the at least one audio signal associated with the audio parameter dependent on the interaction.

The display processor may be further configured to determine at least one of: a capture sound pressure level of the at least one audio signal; an audio beamforming profile for the at least one audio signal; an audio signal profile for at least one frequency band for the at least one audio signal; and an error condition related to the at least one audio signal.

The display processor may when the parameter is a capture sound pressure level of the at least one audio signal further display at least one of: a current capture sound pressure level as a current level; and a peak capture sound pressure level for a predetermined time period as a peak level.

The processor may be configured to change the gain of the at least one audio signal.

The display processor may be further configured to determine at least one of: the audio beamforming profile as a sector of an arc representing the audio beamforming angle; and the audio beamforming profile as a sector of an arc representing the audio beamforming angle relative to a further sector of an arc reflecting a video recording angle.

The display processor may when the parameter is an audio signal profile for at least one frequency band for the at least one audio signal display at least one of: an average orientation of the at least one audio signal; a peak sound pressure level audio signal orientation; a sector representing the sound pressure level of the at least one audio signal for the angle associated with the sector, wherein the radius of the sector is dependent on the sound pressure level; and at least one contour representing the sound pressure level of the at least one audio signal, wherein the contour radius is dependent on the sound pressure level.

The processor may change the orientation or profile width of the audio beamforming angle.

The beamforming angle may define an angle about the centre point of the spatial filtering of the at least one audio signal.

The display processor may be further configured to display at least one of a clipping warning; a capture error condition of the at least one audio signal; and a hardware error associated with the capture of the at least one audio signal.

The processor may be configured to change at least one of: the orientation or profile width of the audio beamforming angle; the gain of the at least one audio signal; and a recording mode.

According to a fourth aspect of the invention there is provided an apparatus comprising: processing means configured to provide a visual representation of at least one audio parameter associated with at least one audio signal; interface processing means configured to detect via an interface an interaction with the visual representation of the audio parameter; and audio processing means configured to process the at least one audio signal associated with the audio parameter dependent on the interaction.

According to a fifth aspect of the invention there is provided a computer-readable medium encoded with instructions that, when executed by a computer perform: providing a visual representation of at least one audio parameter associated with at least one audio signal; detecting via an interface an interaction with the visual representation of the audio parameter; and processing the at least one audio signal associated with the audio parameter dependent on the interaction.

An electronic device may comprise apparatus as described above.

A chipset may comprise apparatus as described above.

BRIEF DESCRIPTION OF DRAWINGS

For better understanding of the present invention, reference will now be made by way of example to the accompanying drawings in which.

Figure 1:
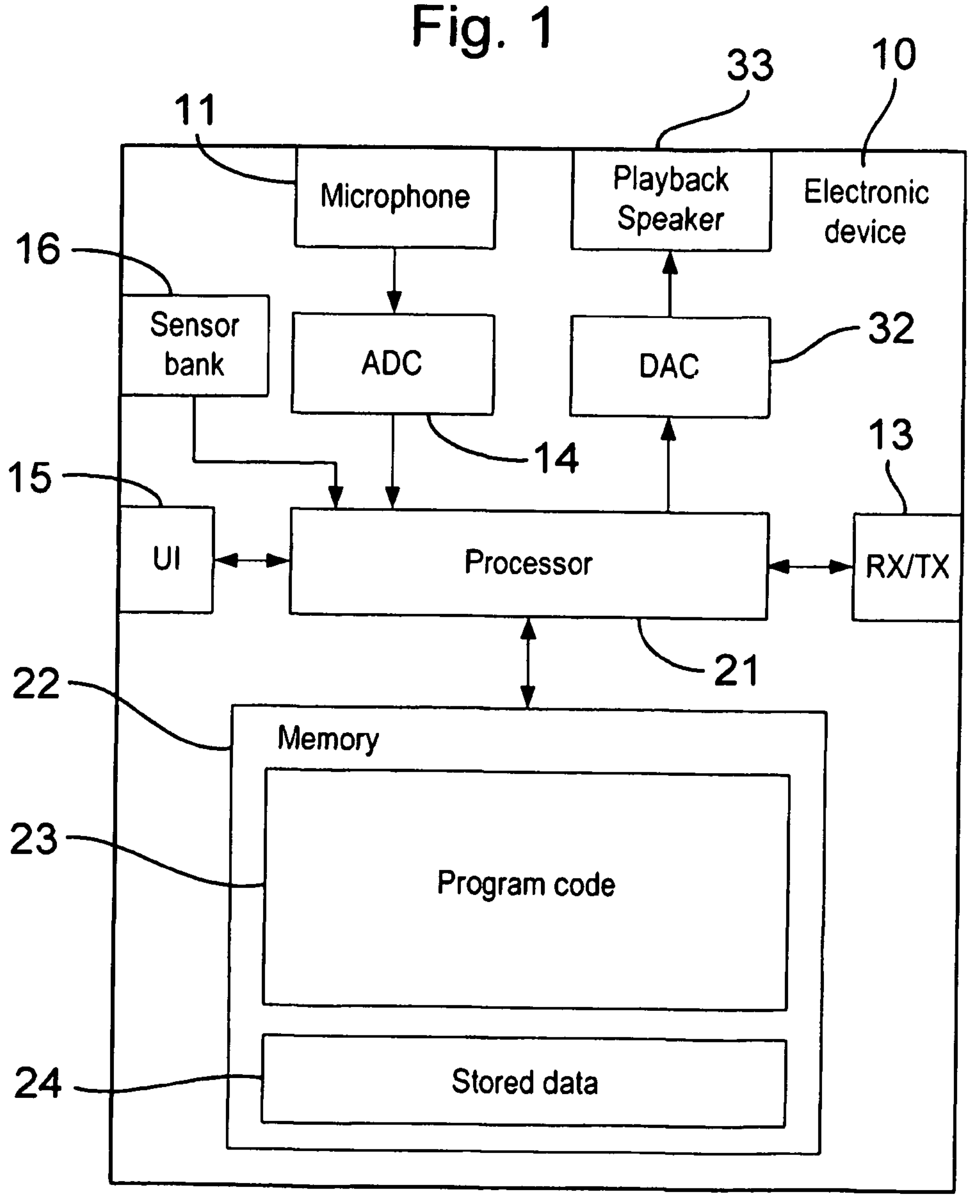
FIG. 1 shows schematically an apparatus employing embodiments of the application.

The following describes apparatus and methods for the provision of enhancing audio capture and recording flexibility in microphone arrays. In this regard reference is first made to FIG. 1 which shows a schematic block diagram of an exemplary electronic device 10 or apparatus, which may incorporate enhanced audio signal capture performance components and methods.

The apparatus 10 may for example be a mobile terminal or user equipment for a wireless communication system. In other embodiments the apparatus may be any audio player, such as an mp3 player or media player, equipped with suitable microphone array and sensors as described below.

The apparatus 10 in some embodiments comprises a processor 21. The processor 21 may be configured to execute various program codes. The implemented program codes may comprise an audio capture/recording enhancement code.

The implemented program codes 23 may be stored for example in the memory 22 for retrieval by the processor 21 whenever needed. The memory 22 could further provide a section 24 for storing data, for example data that has been processed in accordance with the embodiments.

The audio capture/recording enhancement code may in embodiments be implemented at least partially in hardware or firmware.

The processor 21 may in some embodiments be linked via a digital-to-analogue converter (DAC) 32 to a speaker 33.

The digital to analogue converter (DAC) 32 may be any suitable converter.

The speaker 33 may for example be any suitable audio transducer equipment suitable for producing acoustic waves for the user's ears generated from the electronic audio signal output from the DAC 32. The speaker 33 in some embodiments may be a headset or playback speaker and may be connected to the electronic device 10 via a headphone connector. In some embodiments the speaker 33 may comprise the DAC 32. Furthermore in some embodiments the speaker 33 may connect to the electronic device 10 wirelessly 10, for example by using a low power radio frequency connection such as demonstrated by the Bluetooth A2DP profile.

The processor 21 is further linked to a transceiver (TX/RX) 13, to a user interface (UI) 15 and to a memory 22.

The user interface 15 may enable a user to input commands to the electronic device 10, for example via a keypad, and/or to obtain information from the electronic device 10, for example via a display (not shown). It would be understood that the user interface may furthermore in some embodiments be any suitable combination of input and display technology, for example a touch screen display suitable for both receiving inputs from the user and displaying information to the user.

The transceiver 13, may be any suitable communication technology and be configured to enable communication with other electronic devices, for example via a wireless communication network.

The apparatus 10 may in some embodiments further comprise at least two microphones in a microphone array 11 for inputting or capturing acoustic waves and outputting audio or speech signals to be processed according to embodiments of the application. The audio or speech signals may according to some embodiments be transmitted to other electronic devices via the transceiver 13 or may be stored in the data section 24 of the memory 22 for later processing.

A corresponding program code or hardware to control the capture of audio signals using the at least two microphones may be activated to this end by the user via the user interface 15. The apparatus 10 in such embodiments may further comprise an analogue-to-digital converter (ADC) 14 configured to convert the input analogue audio signals from the microphone array 11 into digital audio signals and provide the digital audio signals to the processor 21.

The apparatus 10 may in some embodiments receive the audio signals from a microphone array 11 not implemented physically on the electronic device. For example the speaker 33 apparatus in some embodiments may comprise the microphone array. The speaker 33 apparatus may then transmit the audio signals from the microphone array 11 and thus the apparatus 10 may receive an audio signal bit stream with correspondingly encoded audio data from another electronic device via the transceiver 13.

In some embodiments, the processor 21 may execute the audio capture/recording enhancement program code stored in the memory 22. The processor 21 in these embodiments may process the received audio signal data, and output the processed audio data.

The received audio data may in some embodiments also be stored, instead of being processed immediately, in the data section 24 of the memory 22, for instance for later processing and presentation or forwarding to still another electronic device.

Furthermore the electronic device may comprise sensors or a sensor bank 16. The sensor bank 16 receives information about the environment in which the electronic device 10 is operating and passes this information to the processor 21 in order to affect the processing of the audio signal and in particular to affect the processor 21 in audio capture/recording applications. The sensor bank 16 may comprise at least one of the following set of sensors.

The sensor bank 16 may in some embodiments comprise a camera module. The camera module may in some embodiments comprise at least one camera having a lens for focusing an image on to a digital image capture means such as a charged coupled device (CCD). In other embodiments the digital image capture means may be any suitable image capturing device such as complementary metal oxide semiconductor (CMOS) image sensor. The camera module further comprises in some embodiments a flash lamp for illuminating an object before capturing an image of the object. The flash lamp is in such embodiments linked to a camera processor for controlling the operation of the flash lamp. In other embodiments the camera may be configured to perform infra-red and near infra-red sensing for low ambient light sensing. The at least one camera may be also linked to the camera processor for processing signals received from the at least one camera before passing the processed image to the processor. The camera processor may be linked to a local camera memory which may store program codes for the camera processor to execute when capturing an image. Furthermore the local camera memory may be used in some embodiments as a buffer for storing the captured image before and during local processing. In some embodiments the camera processor and the camera memory are implemented within the processor 21 and memory 22 respectively.

Furthermore in some embodiments the camera module may be physically implemented on the playback speaker apparatus.

In some embodiments the sensor bank 16 comprises a position/orientation sensor. The orientation sensor in some embodiments may be implemented by a digital compass or solid state compass configured to determine the electronic devices orientation with respect to the horizontal axis. In some embodiments the position/orientation sensor may be a gravity sensor configured to output the electronic device's orientation with respect to the vertical axis. The gravity sensor for example may be implemented as an array of mercury switches set at various angles to the vertical with the output of the switches indicating the angle of the electronic device with respect to the vertical axis. In some other embodiments the position/orientation sensor may be an accelerometer or gyroscope.

It is to be understood again that the structure of the apparatus 10 could be supplemented and varied in many ways.

Figure 4:
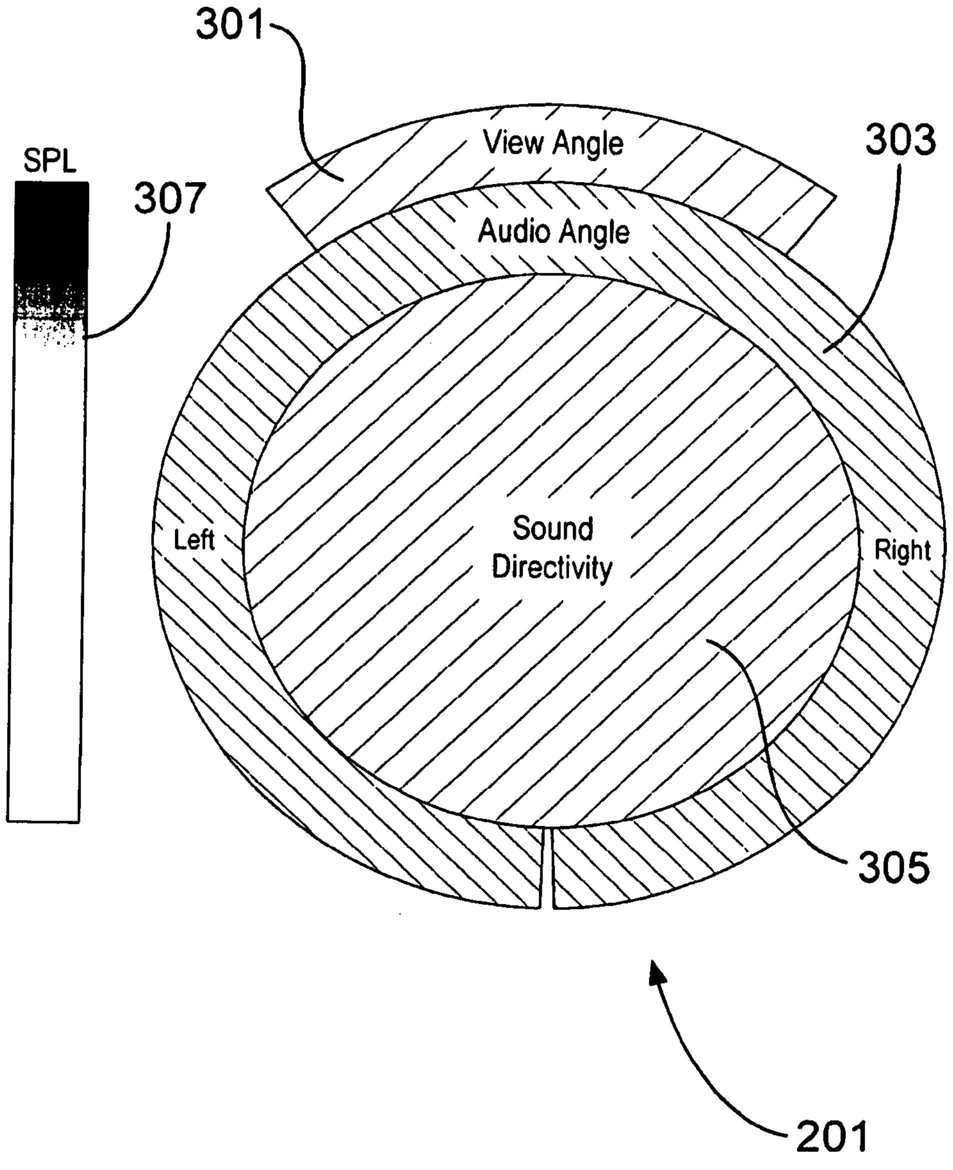
FIG. 4 shows schematically the example visualized audio parameters in further detail.
Figure 5:
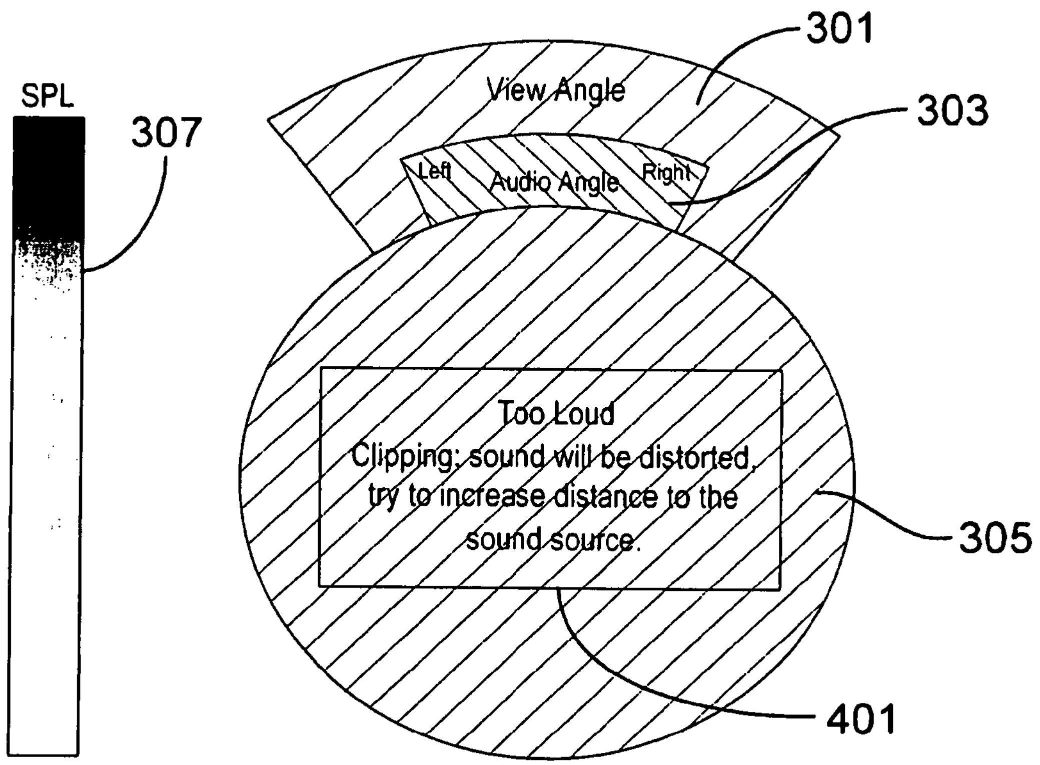
FIG. 5 shows schematically the example visualized audio parameters according to some further embodiments.
Figure 6:
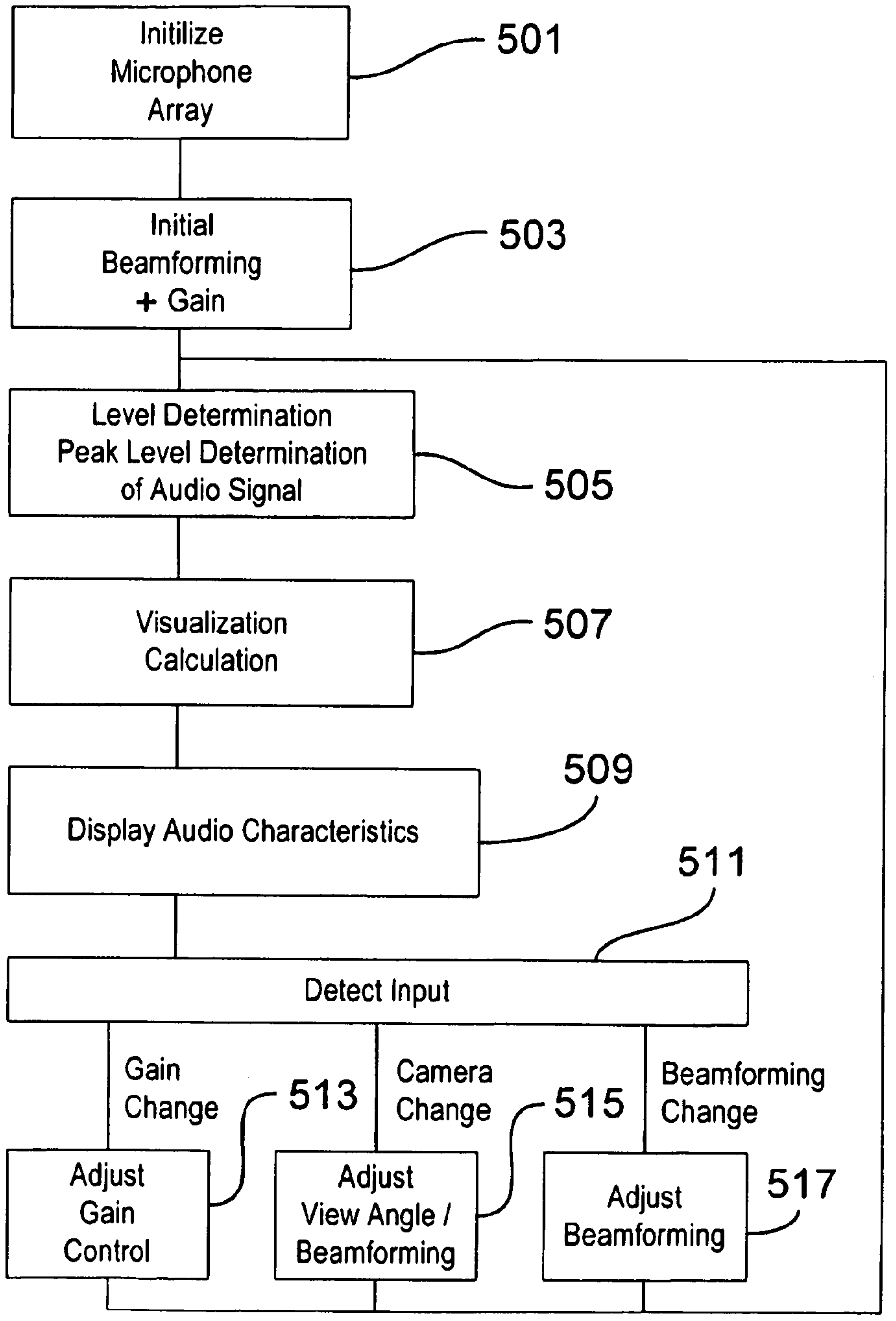
FIG. 6 shows schematically a flow chart illustrating the operation of some embodiments of the application.

It would be appreciated that the schematic structures described in FIGS. 2 to 5 and the method steps in FIG. 6 represent only a part of the operation of a complete audio capture/recording chain comprising some embodiments as exemplarily shown implemented in the electronic device shown in FIG. 1.

Figure 2:
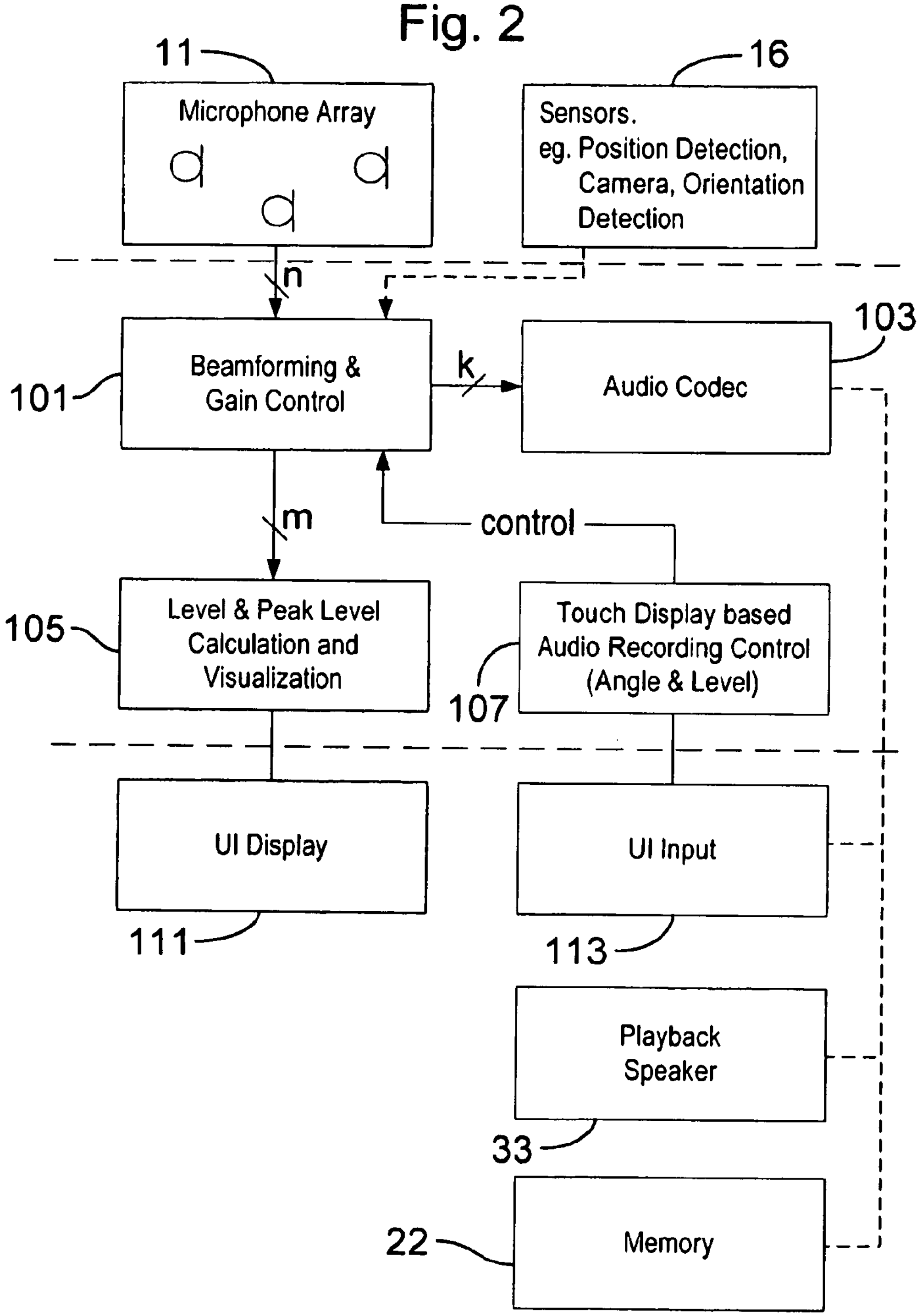
FIG. 2 shows schematically the apparatus shown in FIG. 1 in further detail.

With respect to FIG. 2 and FIG. 6 some embodiments of the application as implemented and operated are shown in further detail.

With respect to FIG. 2, a schematic view of the apparatus 10 is shown in further detail with respect to the components employed in some embodiments of the application.

Furthermore with respect to FIG. 6, there is a flow chart showing a series of operations which may be employed in some embodiments of the application.

In some embodiments the application provides a user or operator of an apparatus an interactive flexible audio and/or audio visual recording solution. The user interface 15 may in these embodiments provide the user the information required from the recorded audio signals by measuring and displaying the sound field in real time so that the operator or user of the apparatus may comprehend what is being recorded. Furthermore in some embodiments, using the same user interface the operator of the apparatus can also adjust parameters in real time and thus adjust the recorded sound field and so avoid recoding or capturing poor quality audio signals.

The apparatus in some embodiments as described previously comprises an array (at least two) of microphones. The microphone array 11 as also described previously is configured to output captured audio signals from each of the microphones in the array. The audio signals may then in some embodiments be passed to an analogue-to-digital converter 14. The analogue-to-digital converter may then be connected to a beamformer and gain control processor 101. In some embodiments, and as shown in FIG. 2, each of the microphones may be Implemented as digital microphones, in other words have an integrated analogue-to-digital converter and the output from each of the microphones output directly to the beamformer and gain control processor 101.

It would be understood that although the following examples describe the capturing of the audio signals that the same apparatus may be configured in some other embodiments to store the captured audio signals, for example within the memory 22 or transmit the captured audio signals to further apparatus via the transceiver 13.

The operation of initialising the microphone array is shown in FIG. 6 by step 501.

The beamforming and gain control processor 101 in some embodiments receives the audio signals from the microphone array and is configured to perform a filtering or beamforming operation to the audio signals from the associated microphone array. Any suitable audio signal beamforming operation may be implemented. Furthermore, the beamforming and gain control processor 101 in some embodiments is configured to generate an initial weighting matrix for application to the audio signals received from the 'n' microphones within the microphone array.

In some embodiments, the beamforming and gain control processor 101 may receive camera sensor information and generate initial beamforming and gain control parameters such that the microphone array attempts to capture the audio signals with the same profile (direction and spread) as the video camera.

The operation of initial beamforming and gain control is shown in FIG. 6 by step 503.

The beamforming and gain control processor 101 in some embodiments may further mix the beamformed audio signals to generate 'k' distinct audio channels. For example the beamforming and gain control may mix the 'n' number of microphone audio signal data streams into 'k' number of audio channels. For example the beamformer and gain control 101 may output in some embodiments a stereo signal output with two audio channels. In further embodiments, a mono single channel or multi-channel output may be generated. For example, the beamforming and gain control processor may mix the beamformed audio streams into a 5.1 audio output with 6 audio channels, or any suitable audio channel combination output. The beamforming and gain control processor 101 may in these embodiments use any suitable mixing technique to generate these audio channel outputs.

In some embodiments and as shown in FIG. 2, the beamforming and gain control processor 101 may output the mixed beamformed signals to an audio codec 103. Furthermore, as shown in FIG. 2 the beamforming and gain control processor in some embodiments may perform a second mixing and output the second mixing 'm' channels to the audio characteristic visualisation processor 105.

The audio codec 103 may in some embodiments process the audio channel data to encode the audio channels to produce a more efficiently encoded data stream suitable for storage or transmission. Any suitable audio codec operation may be employed by the audio codec 103, for example MPEG-4 AAC LC, Enhanced aacPlus (also known as AAC+, MPEG-4 HE AAC v2), Dolby Digital (also known as AC-3), and DTS. The audio codec 103 may according to the embodiment be configured to output the encoded audio stream to the memory 22, or transmit the encoded audio stream using the transceiver 13 or at some later date decode the audio stream and pass the audio stream to the playback speaker 33 via the digital to analogue converter 32.

The audio characteristic visualisation processor 105 is in some embodiments configured to perform a test on audio parameter estimation on the mixed output signal from the beamforming and gain control processor 101. For example, the audio characteristic visualisation 105 in some embodiments may perform the level determination calculation on the received audio signals. In other words the energy value of the captured audio signals is calculated. Furthermore in some embodiments, the audio characteristic visualisation processor 105 determines the peak level, in other words the highest level for a previous (predetermined) period of time.

In some embodiments the audio characteristic visualisation processor 105 calculates the direction of audio signal input from the beamformed audio signal. For example in some embodiments the beamformed microphone array audio signals energy levels are calculated for each of the channel outputs in order to produce an approximate audio direction.

In some other embodiments the audio characteristic visualisation processor 105 may further check the received audio signals for non optimal capture events. For example, the audio characteristic visualisation processor 105 may determine whether or not the current level or peak level has reached a high value, where the current recording gain settings are too high and the recording is distorting or "clipping" as the maximum amplitudes can not be accurately encoded or captured.

Similarly, the audio characteristic visualisation processor 105 may determine that the principal angle of the received audio signals is such that the microphone array is not optimally directed to record or capture the audio signal. For example, if the physical arrangement of the microphones is such that they can not directly receive the acoustic waves. In such examples some directions or orientations are difficult to detect and that can be indicated, but the indication in such embodiments may be stable and does not change. Furthermore, such situations may not be because of the original microphone array design. For example blocked or shadow areas may be created where the user is blocking some of the microphones, e.g., with finger that can be detected and indicated in some embodiments. Similarly faulty microphones in the array may be indicated.

The calculation of at least one audio parameter such as level determination, or peak level determination is shown in FIG. 6 by step 505.

Furthermore the audio characteristic visualisation processor 105 may in some embodiments, from the audio characteristic such as the level, peak level, and direction parameter values produce a visualisation of these values.

The visualisation calculation is shown in FIG. 6 by step 507.

These visualisation elements may then be passed to the user interface display element 111 to be displayed to the operator of the apparatus. The operation of displaying the audio characteristics is shown in FIG. 6 by step 509.

Figure 3:
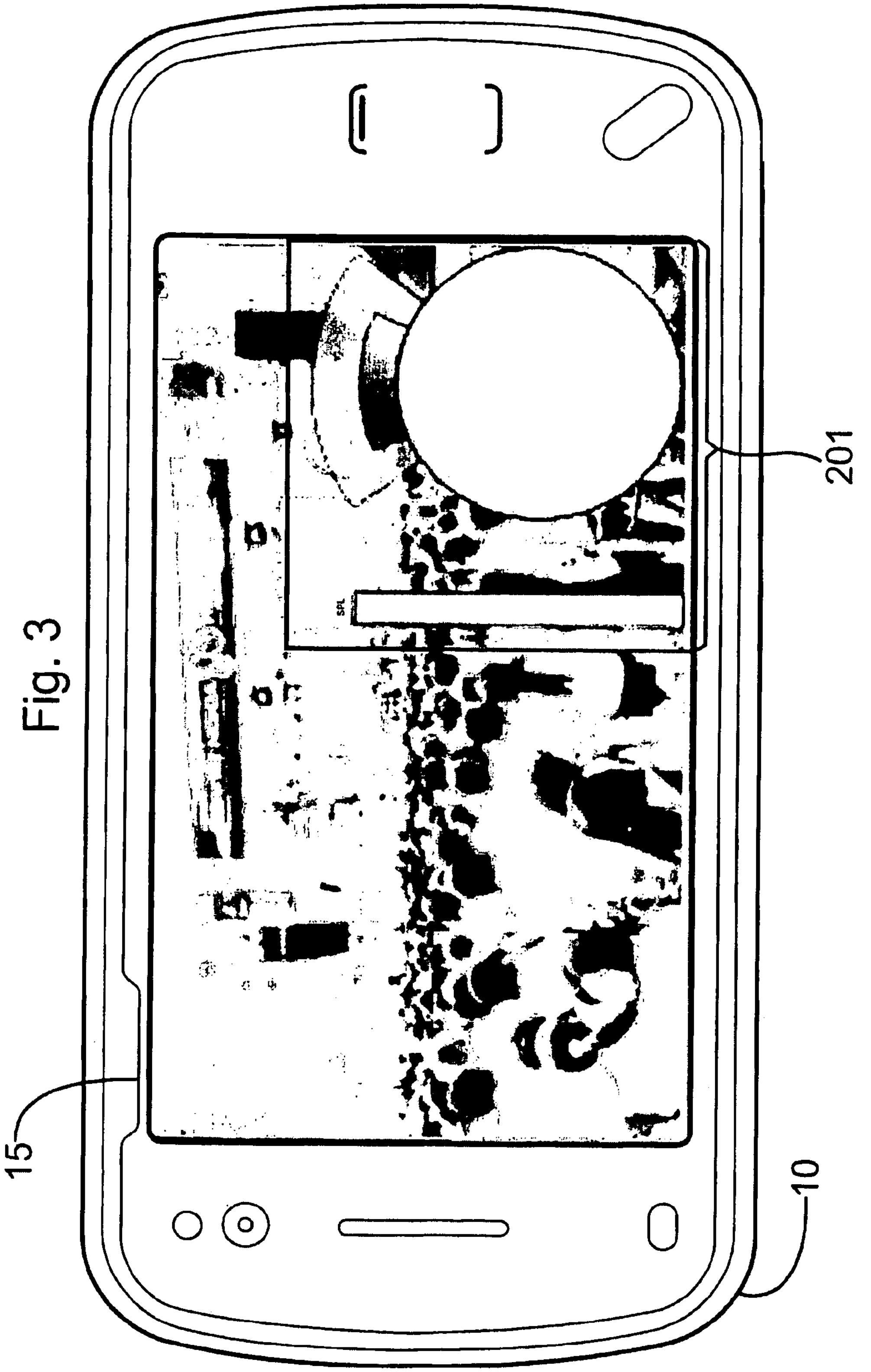
FIG. 3 shows schematically the apparatus and an example of the visualized audio parameters according to some embodiments.

With respect to FIG. 3, an example of the display of the visualisation of the audio parameters is shown. The apparatus 10 comprises the user interface 15 and in particular the user interface display element. On the user interface display is displayed the image captured by the camera and overlaid upon the image is an audio characteristic visualisation 201. With respect to FIG. 4 an example of an audio characteristic visualisation is shown in further detail. The audio characteristics visualisation 201 comprises a sound pressure level visualisation 307 which indicates to the user of the apparatus the current and peak volume levels being captured by the apparatus. The current volume level may for example be indicated by a first bar length and the peak volume level by a background bar length. In some embodiments, the sound pressure level visualisation may also show a 'gain' level—the current gain applied to the received audio signals form the microphone array.

Furthermore the audio characteristics visualisation in some embodiments comprises a sound directivity indicator which provides an indication of the direction of the audio signal being captured. In some embodiments this may be indicated by a compass point or vector indicating from which direction the peak volume is from. In some embodiments the sound directivity indicator may be used to further indicate frequency of recorded sound by displaying the compass point using different colours to represent the dominant frequency of the audio signal.

Figure 7:
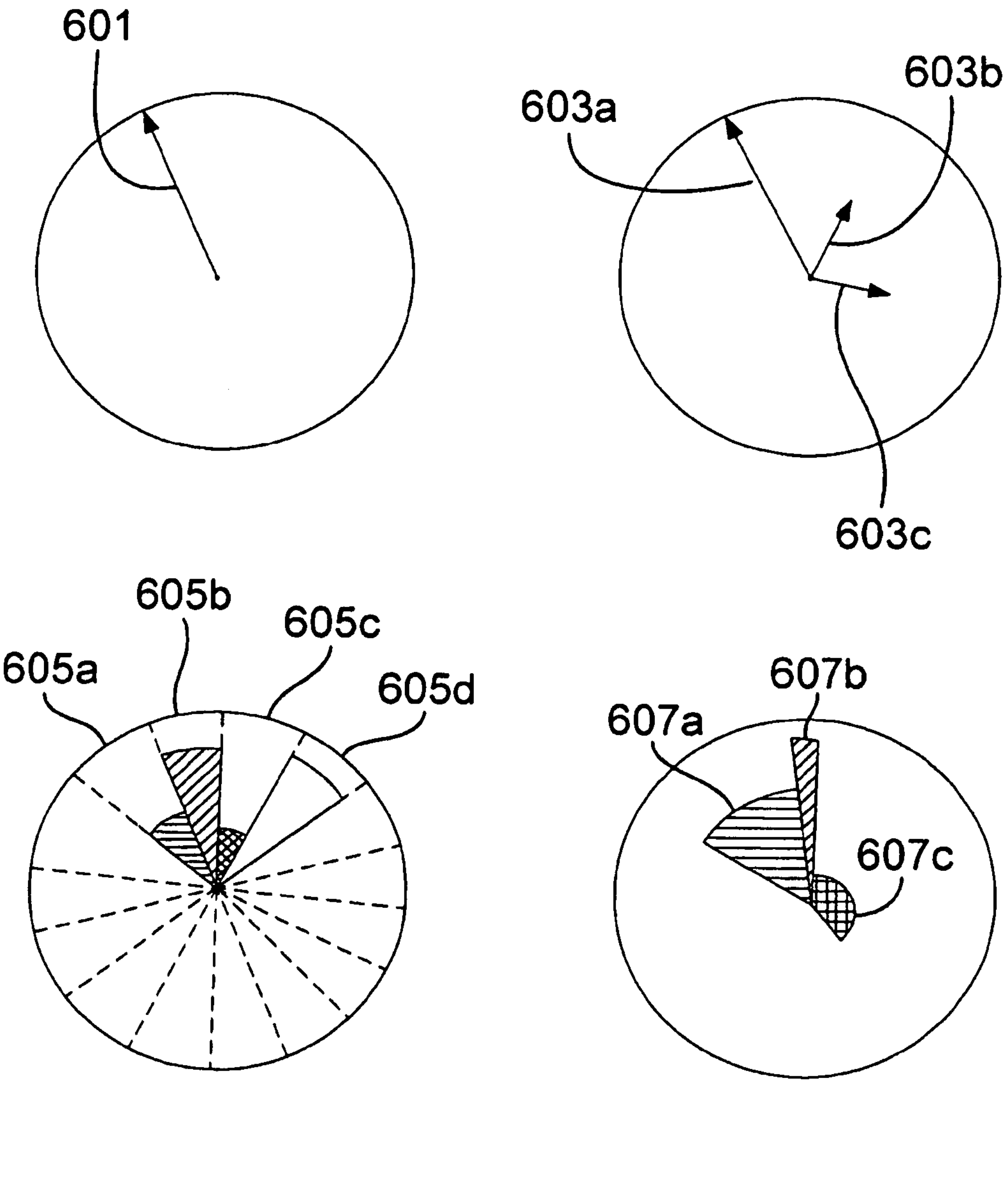
FIG. 7 shows examples of the sound directional parameters visualisation according to some embodiments of the application.
Figure 7:
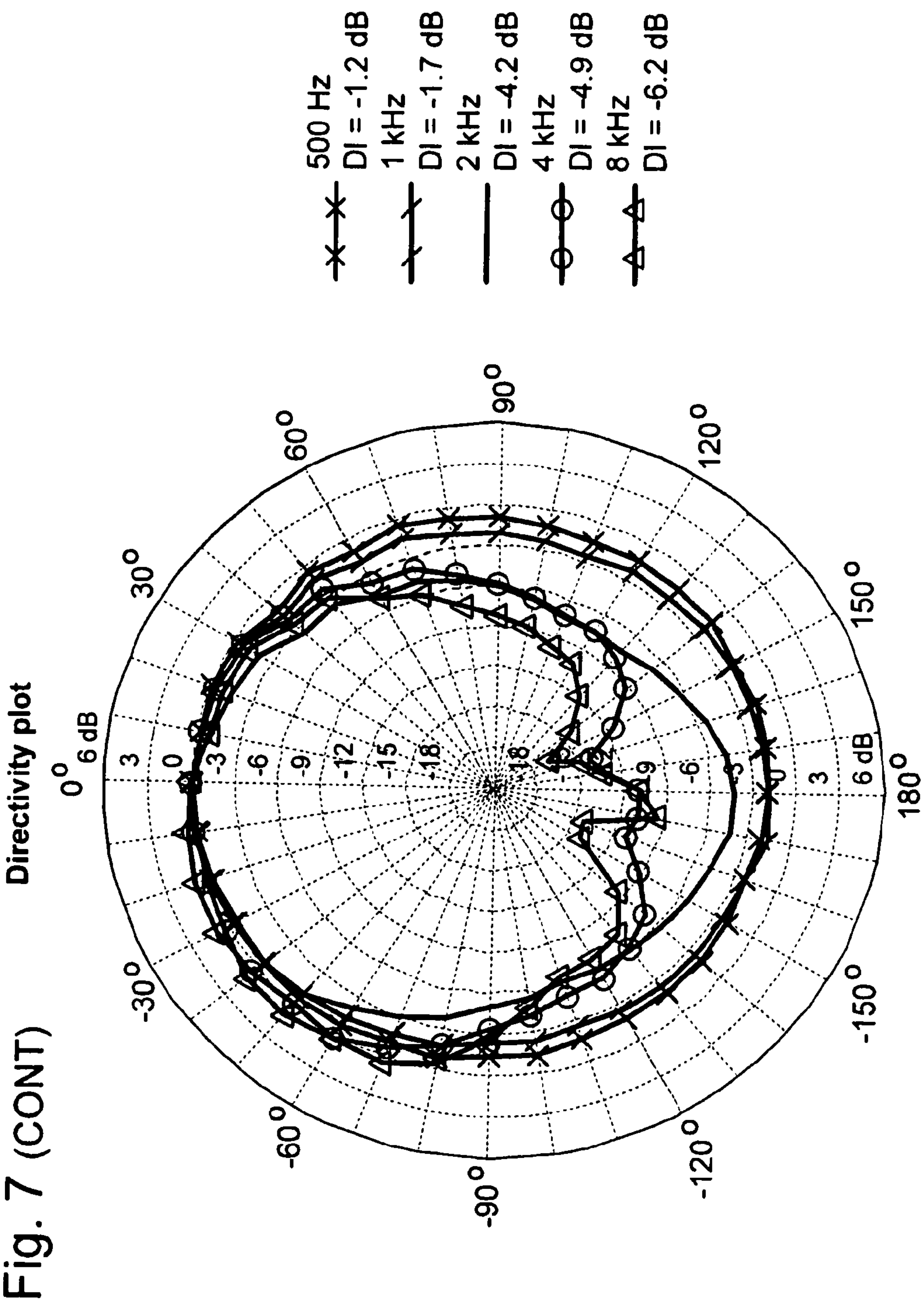

With respect to FIG. 7, directivity indicator visualisations according to some embodiments are shown. The compass directivity indicator 601 described above is shown where the direction indicated by the compass point indicates the peak power direction, or the average power director in some embodiments other suitable forms may be implemented. In some embodiments, the sound directivity of different identifiable "sound sources" may also be indicated on the sound directivity indicator 305. For example, in these embodiments the various relative amplitude values of the sound sources may be displayed using relative line lengths so that a loud sound source 603*a* is indicated by a long line in a first direction, and two further sound sources 603*b* and 603*c* are indicated by shorter line lengths in various other directions.

In some embodiments, as also shown in FIG. 7, the audio level information may be grouped into regular sectors and the sound levels detected and captured in each of these sectors displayed. The four sectors 605*a*, 605*b*, 605*c* and 605*d* show the relative amplitude of the sound from these sectors where the length of the sectors radius is dependent on the relative volume in that directional sector.

Furthermore as shown in FIG. 7 in some embodiments, sectors may be non-regular shape. FIG. 7 shows a first non-regular sector 607*a* indicating the sound directivity of a first region, a second non-regular sector 607*b* with higher but narrower profile and thus indicating a very localised sound source and a third non-regular sector 607*c* which has a lower volume but wider profile area and thus may indicate a wide noise like sound source.

Furthermore in some embodiments the directivity indicator visualisations as also shown in FIG. 7 shows a set of contours. Each of the contours corresponds to a certain frequency or frequency band and the distance from the centre corresponds to the sound level in relation to the level grid/measure.

The audio characteristics visualisation 204 may further in some embodiments comprise an indicator of the current beamforming configuration in the form of a profile of beamforming. For example, as shown in FIG. 4 the audio profile characteristic visualisation or beamforming configuration indicator 303 shows an indicator sector which represents the profile covered by the beamforming operation in the form of an arc profile. For example the arc profile where the beamforming is omnidirectional (and 360 degrees) is also 360 degrees. In some embodiments, the beamforming direction profile may be displayed to show relative beamforming gains, for example by the thickness of line or area of the arc or by a colour difference between the gains.

In some embodiments, the audio profile characteristic visualisation is also shown relative to a view profile visualisation 301. The view profile visualisation 301 shows the current viewing angle as captured by the camera and may be represented as a further arc surrounding a central visualisation part. The view profile visualisation 301 may thus be changed in some embodiments dependent on the amount of zoom applied to the camera so that the greater the zoom, the narrower the viewing angle 301.

With respect to FIG. 5, a further example of the audio characteristics visualisation is shown. In this example, the audio profile characteristic visualisation 303 is indicating that the beamforming focus is much narrower than the viewing angle 301. Furthermore, with respect to FIG. 5 it is shown that the audio visualisation characteristics may comprise text information which may display a warning message 401. In this example, the warning message indicates there is a high probability of clipping or sound distortion in the audio capture process.

The user interface 15 as described previously may further be used to provide an input. For example using the audio characteristics visualisation displayed on the user interface display 111, for example using a touch screen, the user may provide an input, which may then control the audio signal processing.

The detection of an input using the user interface input 113 is shown on FIG. 6 by step 511.

For example in some embodiments the apparatus may adjust the gain control depending on an input sensed on the (sound pressure level) SPL bar indicator 307. For example, the touch control processor 107 may detect or determine an input on the touchscreen where the input moves and towards the bottom of the bar which causes the gain to be reduced by outputting a gain control signal to the beamforming and gain control processor 101 whereas the touch control processor 107 on detecting an input upwards would adjust the gain up by outputting a gain control signal to the beamforming and gain control processor 101. The user interface input in such embodiments may be processed by the touch control processor 107 which on detecting any suitable recognised input be configured to output an associated control signal to the beamforming and gain control processor 101.

The operation of adjustment of gain levels is shown in FIG. 6 by step 513. Any adjustment of gain levels will then be reflected by the audio characteristics which then are visualised.

Furthermore in some embodiments by detecting an input near to the audio angle indicator the beamforming profile may also be changed. For example using 'multi-touch' on the touch screen, on detecting a pinching or opening of multiple inputs the touch control processor 107 may output a control signal to the beamforming and gain processor 101 narrowing or widening the beamforming profile respectively. In some other embodiments a single input detected by the touch control processor 107 may be used to change the orientation of the 'centre' of the beamforming by a similar control signal sent to the beamforming and gain control processor 101.

The touch control processor 107 in these embodiments on detecting any suitable input indicating the beamforming change request may then output a suitable control signal to the beamforming and gain control processor 101 to adjust the beamforming characteristics.

The adjustment of beamforming characteristics is shown in FIG. 6 by step 517. The operation may then loop back to further determining the new level and peak level determination of the audio signal.

Furthermore in some embodiments the sensor 16 may provide an input to the beamforming and gain control processor 101. For example in some embodiments the apparatus may wish to maintain focus on a specific audio direction with an orientation other from the video angle direction. For example, where the apparatus is recording audio from the direction of a stage area, such as shown in FIG. 3, but is then moved changing the angle of the apparatus 10 to focus on another person or object but still maintain audio recording from the stage. In such embodiments, the sensor may provide an indication of the position or orientation of the apparatus which may be used to detect the change of the apparatus and thus control the beamforming operation.

Thus in these embodiments, a change in the camera position may cause the beamforming and gain control processor 101 to adjust the view angle or beamforming parameters depending on the sensor values to maintain audio recording in a previous direction. This change of orientation may be further indicated by the visualisation processor 105 where a change in the view angle and audio angle are displayed.

Furthermore the sensors in the form of the camera may be used to control the beamforming and gain control and/or the visualisation of the audio characteristics of the captured audio signals. For example, on detecting an adjustment of the zoom level of the camera may further be used as a control input to the beamforming and gain control processor 101. In some embodiments where the audio angle is linked to the viewing angle when the camera zooms in an narrower angle is used in beamforming or when the camera unzooms into a wider angle, the beamforming is widened. In other embodiments, the viewing profile information is passed to the audio characteristic visualisation processor 105 to calculate and display the correct profile relationship between audio and video profiles.

Thus in such embodiments, the user may be supplied with sufficient information to make intelligent decision and control mechanisms thus avoid producing poor quality audio recordings.

Furthermore the embodiments of the application graphically show thus what is happening to the "audio picture" around the apparatus and what the current audio recording parameters are in relation to the "audio picture". Using this information, the apparatus may be configured to adjust the audio recording parameters such as beam width and gain in such a way so that they are appropriate for the current recording.

Thus for example where the apparatus is being operated to record a presentation in front of a large group of participants, the apparatus may be operated in such a way to capture speech from only the participant using a narrow (but high gain) beamforming profile and thus avoid the possibility of other sound sources interfering with the capturing of the speech.

It would be understood that in some embodiments the beamforming and gain control processor 111, and/or the characteristic determination and visualisation processor 105 and/or touch control processor 107 may be implemented as programs or part of the processor 21. In some other embodiments the above processors may be implemented as hardware.

Although the above control methods have been described with respect to the controlling of parameters as gain or beam width it would be appreciated by the person skilled in the art that other capturing or recording parameters may be changed in light of the information displayed. For example in some embodiments the information may be displayed and be able to be controlled in order to change the recording mode. The changing of the recording mode may include such controlling operations as frequency filtering. For example when noticing low frequency noise, the apparatus may offer the suggestion or permit the controlling the capture profile to high pass filter the microphone signals. In some other embodiments the changing of the recording mode may involve switching between different mixes in order to produce a mix based on the information displayed. For example a captured stereo signal may not be acceptable due to noise levels and the apparatus may suggest to switch to a mono signal capture mode. Similarly where the signal levels are sufficient to enable a multichannel audio capture process the apparatus may by displaying this information suggest that a multichannel mix is captured such as a 5.1 audio mix, or a 2.0 stereo mix.

Thus in at least one embodiments there is a method comprising: providing a visual representation of at least one audio parameter associated with at least one audio signal; detecting via an interface an interaction with the visual representation of the audio parameter; and processing the at least one audio signal associated with the audio parameter dependent on the interaction Although the above examples describe embodiments of the invention operating within an electronic device 10 or apparatus, it would be appreciated that the invention as described below may be implemented as part of any audio processor. Thus, for example, embodiments of the invention may be implemented in an audio processor which may implement audio processing over fixed or wired communication paths.

Thus user equipment may comprise an audio processor such as those described in embodiments of the invention above.

It shall be appreciated that the term electronic device and user equipment is intended to cover any suitable type of wireless user equipment, such as mobile telephones, portable data processing devices or portable web browsers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Therefore in summary there is in at least one embodiment an apparatus comprising: a display processor configured to provide a visual representation of at least one audio parameter associated with at least one audio signal; an interactive video interface configured to determine an interaction with the visual representation of the audio parameter; and an audio processor configured to processing the at least one audio signal associated with the audio parameter dependent on the interaction.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

Thus at least one embodiment comprises a computer-readable medium encoded with instructions that, when executed by a computer perform: providing a visual representation of at least one audio parameter associated with at least one audio signal; detecting via an interface an interaction with the visual representation of the audio parameter; and processing the at least one audio signal associated with the audio parameter dependent on the interaction.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:

(a) hardware-only circuit implementations (such as implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:

providing a visual representation of at least one audio parameter associated with at least one audio signal where the at least one audio signal represents a sound field around an apparatus in real time by at least two microphones of the apparatus;

detecting via an interface an interaction with the visual representation of the at least one audio parameter; and processing the at least one audio signal associated with the at least one audio parameter dependent on the detected interaction;

wherein providing the visual representation of at least one audio parameter associated with the at least one audio signal comprises at least one of:

determining a capture sound pressure level of the at least one audio signal;

determining an audio beamforming profile for the at least one audio signal;

determining an audio signal profile for at least one frequency band for the at least one audio signal; or determining an error condition related to the at least one audio signal.

2. The method as claimed in claim 1, wherein providing the visual representation of at least one audio parameter associated with the at least one audio signal when the at least one audio parameter is a capture sound pressure level of the at least one audio signal comprises at least one of:

displaying a current capture sound pressure level as a current level; and displaying a peak capture sound pressure level for a predetermined time period as a peak level.

3. The method as claimed in claim 2, further comprising:

controlling the processing of the at least one audio signal associated with the at least one audio parameter by changing a gain of at least one audio signal capture.

4. The method as claimed in claim 1, wherein providing the visual representation of the at least one audio parameter associated with the at least one audio signal when the at least one audio parameter is an audio beamforming profile for the at least one audio signal comprises at least one of:

displaying the audio beamforming profile as a sector of an arc representing an audio beamforming angle; and displaying the audio beamforming profile as a sector of an arc representing an audio beamforming angle relative to a further sector of an arc reflecting a video recording angle.

5. The method as claimed in claim 1, wherein providing the visual representation of the at least one audio parameter associated with the at least one audio signal when the at least one audio parameter is an audio signal profile for at least one frequency band for the at least one audio signal comprises at least one of:

displaying an average orientation of the at least one audio signal;

displaying a peak sound pressure level audio signal orientation;

displaying a sector representing the capture sound pressure level of the at least one audio signal for an angle associated with the sector, wherein the radius of the sector is dependent on the capture sound pressure level of the at least one audio signal; and displaying at least one contour representing the capture sound pressure level of the at least one audio signal, wherein the contour radius is dependent on the capture sound pressure level of the at least one audio signal.

6. The method as claimed in claim 4, wherein controlling a processing of the at least one audio signal associated with the at least one audio parameter comprises changing the orientation or profile width of the audio beamforming angle, and wherein the audio beamforming angle defines an angle, about the centre point of the spatial filtering of the at least one audio signal.

7. The method as claimed in claim 1 wherein the at least one audio parameter represents at least one of:

a direction a sound source being recorded; and a warning message for clipping or sound distortion.

8. The method as claimed in claim 1, wherein providing the visual representation of the at least one audio parameter associated with the at least one audio signal when the at least one audio parameter determines an error condition related to the at least one audio signal comprises at least one of:

displaying a clipping warning;

displaying a capture error condition of the at least one audio signal; and displaying a hardware error associated with the capture of the at least one audio signal.

9. The method as claimed in claim 8, wherein controlling the processing of the at least one audio signal associated with the at least one audio parameter comprises at least one of:

changing an orientation or profile width of an audio beamforming angle;

changing the gain of the at least one audio signal; and changing the recording mode.

10. An apparatus comprising at least two microphones, at least one processor and at least one memory including computer program code, the at least one memory and the computer program code being configured to, with the at least one processor, cause the apparatus at least to:

provide a visual representation of at least one audio parameter associated with at least one audio signal where the at least one audio signal represents a sound field around the apparatus in real time by the at least two microphones;

detect via an interface an interaction with the visual representation of the at least one audio parameter; and process the at least one audio signal associated with the at least one audio parameter dependent on the detected interaction;

wherein providing the visual representation of the at least one audio parameter associated with the at least one audio signal causes the apparatus at least to perform one of:

determine a capture sound pressure level of the at least one audio signal;

determine an audio beamforming profile for the at least one audio signal;

determine an audio signal profile for at least one frequency band for the at least one audio signal; or determine an error condition related to the at least one audio signal.

11. The apparatus as claimed in claim 10, wherein providing the visual representation of the at least one audio parameter associated with the at least one audio signal when the at least one audio parameter is a capture sound pressure level of the at least one audio signal causes the apparatus at least to perform at least one of:

display a current capture sound pressure level as a current level; and display a peak capture sound pressure level for a predetermined time period as a peak level.

12. The apparatus as claimed in claim 11, wherein causing the apparatus to control the processing of the at least one audio signal associated with the at least one audio parameter causes the apparatus at least to change the gain of the at least one audio signal capture.

13. The apparatus as claimed in claim 10, wherein causing the apparatus to provide the visual representation of the at least one audio parameter associated with the at least one audio signal when the at least one audio parameter is an audio beamforming profile for the at least one audio signal causes the apparatus at least to perform at least one of:

display the audio beamforming profile as a sector of an arc representing the audio beamforming angle; and display the audio beamforming profile as a sector of an arc representing the audio beamforming angle relative to a further sector of an arc reflecting a video recording angle.

14. The apparatus as claimed in claim 10, wherein providing the visual representation of the at least one audio parameter associated with the at least one audio signal when the at least one audio parameter is an audio signal profile for at least one frequency band for the at least one audio signal causes the apparatus at least to perform at least one of:

display an average orientation of the at least one audio signal;

display a peak sound pressure level audio signal orientation;

display a sector representing the capture sound pressure level of the at least one audio signal for the angle associated with the sector, wherein the radius of the sector is dependent on the capture sound pressure level of the at least one audio signal for the angle associated with the sector; and display at least one contour representing the capture sound pressure level of the at least one audio signal, wherein the contour radius is dependent on the capture sound pressure level of the at least one audio signal.

15. The apparatus as claimed in claim 13, wherein causing the apparatus to control the processing of the at least one audio signal associated with the at least one audio parameter causes the apparatus at least to change the orientation or profile width of the audio beamforming angle.

16. The apparatus as claimed in claim 13, wherein the audio beamforming angle defines an angle about the centre point of the spatial filtering of the at least one audio signal.

17. The apparatus as claimed in claim 10, wherein causing the apparatus to provide the visual representation of the at least one audio parameter associated with the at least one audio signal when the at least one audio parameter determines an error condition related to the at least one audio signal causes the apparatus at least to perform at least one of:

display a clipping warning;

display a capture error condition of the at least one audio signal; and display a hardware error associated with the capture of the at least one audio signal.

18. The apparatus as claimed in claim 17, wherein causing the apparatus to control the processing of the at least one audio signal associated with the at least one audio parameter causes the apparatus at least to perform at least one of:

change an orientation or profile width of an audio beamforming angle;

change the gain of the at least one audio signal; and change the recording mode.

19. The method as claimed in claim 1, wherein microphone signals of the at least two microphones are configured to switch to a mono signal based on, at least in part, a noise level around the apparatus, and wherein the method further comprises controlling a capture mode based the at least one audio parameter and the provided visual representation comprises an indication of the capture mode being displayed.

20. The method as claimed in claim 1, wherein the at least one audio parameter is adjustable based on the provided visual representation so as to avoid a poor quality of the at least one audio signal.

* * * * *